United States Patent Office 3,586,537
Patented June 22, 1971

3,586,537
PROCESS FOR THE PRODUCTION OF XYLOSE
Kurt Steiner, Starrkirch, and Herbert Lindlar, Reinach, Switzerland, assignors to Hoffmann-La Roche Inc., Nutley, N.J.
No Drawing. Filed July 16, 1969, Ser. No. 842,375
Claims priority, application Switzerland, July 26, 1968, 11,285/68
Int. Cl. C13k 9/00
U.S. Cl. 127—37    11 Claims

ABSTRACT OF THE DISCLOSURE

A process for producing xylose by hydrolyzing a cellulose and xylan containing material with an aqueous solution of oxalic acid. The xylose may be hydrogenated to xylitol.

BACKGROUND OF THE INVENTION

In the past, xylose has been produced by hydrolyzing xylan- and cellulose-containing vegetable materials with mineral acids. For example, xylose has been produced by allowing a highly concentrated mineral acid at room temperature or very dilute mineral acid at elevated temperature to act on the vegetable materials. This procedure has proven disadvantageous since the xylose is produced as a mixture of pentoses and hexoses which can only be separated into the individual components with great difficulty and high losses.

There has been no lack of attempts to subject cellulose and xylan containing materials to a fractional, two-stage hydrolysis and to successively break down the more easily and more difficultly hydrolyzable carbohydrates. Thus, for example, it has been proposed to first break down the pentosans in these vegetable materials by means of a prehydrolysis with a medium-strength mineral acid in the presence of a water-soluble organic solvent which possesses the property of selectively dissolving certain pentoses, above all xylose, and subsequently, after separating off the prehydrolysate, to hydrolyze the more difficultly attacked hexosans with a highly concentrated mineral acid without the addition of a solvent. Although the pentoses and hexoses could indeed be concentrated by this procedure, they could not be sharply separated from each other. Both the prehydrolysate, and the latter hydrolysate, obtained by this process contain a mixture of xylose and glucose which is difficult to separate.

SUMMARY OF THE INVENTION

In accordance with this invention, it has been found that a substantially chemically pure xylose can be obtained by treating materials which contain cellulose and xylan with oxalic acid. Furthermore, it has unexpectedly been found that upon treatment with oxalic acid, the cellulose in the cellulose and xylan containing material is not broken down or hydrolyzed into the difficultly separable sugars. By this process, the xylose that is produced spontaneously crystallizes from the reaction solution to provide substantially chemically pure xylose.

As the starting material, any conventional material containing xylan and cellulose can be utilized. Among the suitable starting materials for carrying out the process in accordance with the invention are included all angiosperms, that is both monocotyledonous plants such grasses (e.g. oats or maize) and dicotyledonous plants such as deciduous trees (e.g. beech, poplar, birch or alder).

Of the staring materials quoted by way of example, beechwood, which is available in large quantities and has small economic value, occupies a special position. Especially suitable for the hydrolysis are freshly cut and air-dried beech-wood shavings.

Oxalic acid occupies a special position in the breaking down or hydrolyzing of the starting material. Formic acid and acetic acid, for example, are not capable of breaking down the xylan fraction in a satisfactory manner, even under energetic conditions.

Experiments have shown that a concentration of oxalic acid in water of about 1 percent by weight is still strong enough to hydrolyze the xylan and cellulose containing starting material. However, aqueous oxalic acid having an oxalic acid concentration up to 5 percent by weight can be utilized in carrying out this reaction. Due to economic considerations, oxalic acid concentrations of more than 5 percent are not recommendable. This is particularly so, since at higher acid concentration degradation of the xylose ensues. The optimal acid strength in the aqueous solution is 3 percent by weight.

The about 1 to about 5 percent aqueous oxalic solution can be added to the starting material, in accordance with this invention, in an amount of from about 1 liter to about 5 liters per kg. of the starting material. It is to be understood that for optimum results the amount of aqueous oxalic acid solution can vary very widely within this range since the amount of oxalic acid solution necessary for optimum results depends upon the concentration of solution, temperature of reaction, bulk density of starting material, etc. Porous materials with low bulk density which occupy a large volume (e.g. cereal straw) also require correspondingly large amounts of acid.

The reaction temperature when breaking down the xylan and cellulose containing material with oxalic acid, can also be held within wide limits. If an about 3 percent aqueous oxalic acid is used, the hydrolysis already begins at about 50° C. It proceeds quicker at 80° C. The timespan until the reaction dies away can be effectively shortened, however, by an increase of the temperature. It is also possible to increase the reaction temperature to over 100° C. under pressure. However, it has been found that it is not expedient to allow the temperature to rise substantially over about 125° C., viz. over 130° C., since at this temperature range, xylose may be further degraded to furfural, which is indicated visually by the distinct darkening of the solution. When using an about 3 percent oxalic acid, the optimal reaction temperature lies at about 100° C. [boiling temperature of the reaction mixture]. Under these conditions, the optimal reaction time for the hydrolysis is about 6 hours.

It is suitable to wash the starting material with water before treating with oxalic acid, thereby removing free sugars particularly hexoses, and also tannins and colouring matter.

This pre-wash is suitably carried out by fractional washing of the starting material for about 1 hour with boiling water.

Also, the treatment with oxalic acid can be carried out in two stages in such a manner that the optionally prewashed starting material is treated with an about 1% aqueous oxalic acid for about 1 hour, suitably at boiling heat the resulting acidic solution is separated and the material is once more treated with a 3% aqueous oxalic acid for about 6 hours, suitably at boiling heat.

The advantage of this fractional treatment with oxalic acid is that araban which may be present in the starting material together with xylan, is largely transformed by the pre-hydrolysis into arabinose which can be removed.

The xylose, which is thus produced, can be utilized as an intermediate for xylitol. The reduction of the aldehyde or keto groups of reducing sugars such as xylose to produce xylitol has been carried out by known methods such as in a chemical or catalytic manner. For example, xylose has been reduced to xylitol with the aid of a sodium amalgam or in the presence of a nickel catalyst. However, in order to carry out this reduction it is indispensable to utilize pure xylose as the starting material. Even slight impurities in the xylose starting material can lead to a standstill in the hydrogenation process. This standstill results in the fact that hydrogenation cannot be continued.

As shown above, the production of xylose from xylan and cellulose containing materials in the past has provided xylose in admixture with difficult to separate keto sugar by-products. Furthermore, the sugar alcohol mixtures (e.g. xylitol/sorbitol mixture) can only be separated with great difficulty and with high losses by repeated fractional crystallization. Therefore, it has long been desired to provide a means for producing substantially chemically pure xylose from materials containing xylan and cellulose without the necessity for utilizing cumbersome separation procedures.

In accordance with this invention, the reaction mixture containing the pure xylose produced by treating a xylan and cellulose containing material with oxalic acid can be converted to xylitol by hydrogenation without the necessity of isolating the xylose from the reaction mixture. All that need be done is that this reaction mixture be deacidified and decolorized prior to hydrogenation. In accordance with this invention, it has been found that the xylose produced by treatment with oxalic acid has such a high degree of purity that hydrogenation of the reaction mixture containing the xylose produces xylitol without any danger of the hydrogenation process coming to a standstill.

DETAILED DESCRIPTION

The process in accordance of the invention for the production of xylose and xylitol from materials containing xylan and cellulose, by treatment with an acidic agent and subsequent facultative hydrogenation is thus characterized in that it comprises treating the starting material with an about 1 to about 5% aqueous oxalic acid at a temperature range of from about 50° C. to about 130° C. and, if desired, hydrogenating the resulting xylose, without previous isolation to xylitol.

The oxalic acid aqueous hydrolysate obtained, containing about 5 percent xylose, can be worked up as explained hereinafter. However, since xylose is stable in boiling aqueous oxalic acid, it is advantageous to use the hydrolysate again for the breaking down of a second charge of starting material without adding, or adding only small amounts of, oxalic acid. This procedure can be repeated yet a further time. The sugar solution with a content of about 10 percent xylose obtained after the breaking-down of the third charge can then be expediently further processed by decolorization and deacidification.

Any conventional means of decolorizing can be utilized to decolorize the amber-yellow colored reaction mixture containing the xylose. Among the preferred means for decolorizing the reaction medium is to filter the reaction medium with a decolorizing resin. Any conventional decolorizing resin can be utilized in this procedure. Among the decolorizing resins are included the nonionic resins, and the cationic resins, and the anionic ion exchange resins. Any conventional nonionic resin and anionic or cationic ion exchange resin such as, polystyrene sulfonic acid ion exchange resins and polystyrene amine resins can be utilized for decolorizing the hydrolysate. Among the preferred decolorizing resins which are utilized in the sugar industry are included Asmit 224 [polyamine resin], Asmit 261 [polystyrene resin] or Asmit 173N [resin of aromatic amine type].

Any conventional means of deacidifying the hydrolysate can be utilized in this process. Among the deacidification processes which can be utilized are included neutralization with a conventional base such as slaked lime. The deacidification step can take place before or after the decolorization step. Also, deacidification can be carried out by ion exchange utilizing an ion exchange resin such as Amberlites XAD 1 and XAD 2 [polymer polystyrene resin]. In the case where a basic ion exchange resin is utilized, passing the hydrolysate through the basic ion exchange resin will cause both deacidification and decolorization. Among the preferred basic ion exchange resins which can be utilized to both decolorize and deacidify the hydrolysate are included the weakly basic ion exchange resins such as the amine ion exchange resins.

A preferred procedure for decolorization and deacidification consists in separating the crude aqueous hydrolysate from the solid material and filtering the hydrolysate through a column of Asmit 173 NP [porous resin of aromatic amine type]. This decolorizing resin has good decolorizing properties and, as a weakly basic ion-exchanger, at the same time quantitatively retains the oxalic acid, which by rinsing with hydrochloric acid can be displaced again from the column, recovered and used again for further acidic hydrolyses.

The basic ion exchange resins in addition to decolorizing and deacidifying the hydrolysate, can be utilized to recover the oxalic acid from the hydrolysate. When the hydrolysate is passed through the basic ion exchange resin, the oxalic acid in the hydrolysate can be removed thereof and retained on the basic ion exchange resin. The oxalic acid can be eluted from the basic ion exchange resin by any conventional strongly acidic eluting means. Among the conventional eluting means are included hydrochloric acid, sulfuric acid, hydrobromic acid, phosphoric acid etc. Washing the ion exchange resin with a strong acid, elutes the oxalic acid from the basic ion exchange resin. The oxalic acid recovered in this manner can be reused to hydrolyze a fresh batch of cellulose and xylene containing material.

The chemically practically pure xylose which spontaneously crystallizes out on concentration of the practically colorless aqueous xylose solution thus obtained melts at 143–144° C. The sugar can be recrystallized, for example from ethanol/water, without alteration of the melting point.

The sugar occurring in nature in the free form in bamboo shoots which is commonly designated as xylose has the absolute D-configuration and exists in the following forms:

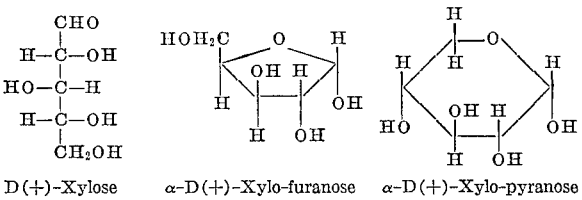

D(+)-Xylose   α-D(+)-Xylo-furanose   α-D(+)-Xylo-pyranose

As mentioned hereinbefore, the decolorized and deacidified aqueous xylose solution is so pure that it can be hydrogenated without further ado. The hydrogenation can be carried out in a chemical or catalytic way, for example with the help of sodium amalgam or a complex metal hydride such as lithium aluminum hydride or sodium borohydride, but preferably in the presence of a catalyst, for example a noble-metal catalyst such as platinum or palladium, but especially in the presence of a nickel catalyst such as Raney-nickel. However, any conventional means of hydrogenating an aldehyde or ketone can be utilized in this process.

The hydrogenation can be carried out under any conventional hydrogenation conditions. Any temperature of from about 70° C. to 120° C. and hydrogen pressures of from about 10 atm. (gauge) to about 50 atm. (gauge) can be utilized. The hydrogenation of xylose to xylitol is preferably carried out in an aqueous alkaline medium at a pH of about 9 at a hydrogen atmosphere of about 30 atm. (gauge) and at a temperature of about 105–110° C.

The hydrogenation proceeds quantitatively. The solution, freed from the catalyst, can be expediently deionized by filtration through a cation ion exchange resin. Any conventional cation ion exchange resin can be utilized to deionize the reaction product. A suitable exchanger is, for example, Lewatit S 100 [resin on polystyrene basis]. The filtrate, which runs off colorless, is conveniently evaporated to dryness under careful conditions. The residual xylitol crystallizes from warm (about 45° C.) ethanol and melts at about 94–95° C. The degree of purity already amounts to 99.5 percent. It can be increased to 99.7 to 100 percent by renewed recrystallization of the sugar from aqueous ethanol.

Xylitol, a sugar of the formula

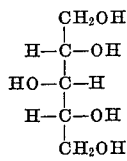

which in nature occurs in free form in mushrooms, has a very pleasant pure sweet taste. Xylitol is resorbed by the human organism without influencing the glucose content of the blood. Xylitol is therefore an ideal sweetener for diabetics.

The invention is further illustrated by the following examples which are illustrative but not limitative of the claimed invention.

EXAMPLE 1

35 kg. of air-dry beech-wood shavings are introduced into a solution of 3 kg. of oxalic acid in 100 l. of deionized water and heated under reflux conditions for 10 hours. The reaction mixture is subsequently cooled to 50° C. The wood shavings are separated off and washed with about 100 l. of deionized water. The light orange-colored solution, combined with the wash-water is filtered over 60 l. of the decolorizing resin Asmit 173 NP (porous resin of aromatic amine type). The xylose content of the filtrate is continuously checked with the aid of a refractometer.

After completed filtration, the decolorizing resin is rinsed wtih 60 l. of deionized water. The decolorized and deacidified solution, together with the wash-water, is concentrated to ca. 8 l. The xylose which precipitates in fine white crystals is filtered off, washed with a little cold water and ethanol and dried. 4250 g. of xylose of melting point 143–144° C. are obtained. The degree of purity amounts to 99.5%.

EXAMPLE 2

800 g of oak-wood shavings are introduced into a solution of 120 g. of oxalic acid in 4 l. of deionized water and heated under reflux conditions for 10 hours. The reaction mixture is subsequently cooled to 60° C. and separated from the wood shavings. By the procedure given in Example 1, the hydrolysate is de-acidified and decolorized with the aid of Asmit 173 NP (porous resin of aromatic amine type), then concentrated to about 250 ml. and, after the addition of 500 ml. of glacial acetic, cooled to 5° C. for about 12 hours. The xylose which precipitates in fine white needles [136 g.] melts at 142–144° C. after washing with a little cold ethanol.

In an analogous manner, there can, for example, be further obtained from—

| 500 g. of: | G. of xylose |
|---|---|
| Ash-wood shavings | 89 |
| Elm-wood shavings | 69 |
| Spruce-wood shavings | 30 |
| Maple-wood shavings | 78 |
| Birch-wood shavings | 80 |

EXAMPLE 3

The decolorized and de-acidfiied hydrolysate obtained from 35 kg. of beech-wood shavings according to the procedure of Example 1 is concentrated to 15 l., adjusted to a pH of 9 with caustic soda and, after the addition of 400 g. of water-moist Raney-nickel, hydrogenated for 10 hours at a temperature of 100° C. and a hydrogen pressure of 30 atm. (gauge). The solution is cooled and separated from the catalyst. The catalyst is washed with 2 l. of deionized water. The wash-water is combined with the filtrate and filtered over about 2 l. of Lewatit S 100 (resin on polystyrene basis). The cation-exchanger is rinsed with 2 l. of deionized water. Filtrate and wash-liquid are together evaporated to dryness under careful conditions in a rotary evaporator. The residual xylitol is dissolved in 4 l. of ethanol at 45° C. The solution is slowly cooled with moderate stirring and held at −10° C. for about 5 hours to complete the crystallization. The xylitol which precipitates in fine white crystals is filtered off, moistened with 1 l. of ethanol and, after filtering off, again washed with 500 ml. of ethanol. 3470 g. of xylitol of melting point 89–91° C. are obtained. The degree of purity amounts to 99.5%.

By recrystallization once from alcohol/water, the melting point can be raised to 94–95° C., the content to 99.7%.

EXAMPLE 4

35 kg. of air-dry beech-wood shavings are introduced into a solution of 3 kg. of oxalic acid in 100 l. of deionized water and heated under reflux conditions for 10 hours. The reaction mixture is subsequently cooled to 50° C. The hydrolysate (about 90.1) separated from the beech-wood shavings is, after the addition of 0.3 kg. of oxalic acid in 10 l. of deionized water, again employed for the breaking-down of a further 35 kg. of fresh beech-wood shavings utilizing the conditions given above.

The first wood residue is washed with 100 l. of deionized water. The wash-water collected is used to wash the second wood residue obtained after separating off the hydrolysate, which wood residue is subsequently rinsed once more with 30.1 of deionized water. The hydrolysate, with the combined wash-waters, is deacidified and decolorized by the procedure given in Example 1. The deacidified and decolorized hydrolysate containing xylose is hydrogenated to xylitol in the manner of Example 3. The xylitol is recovered in the manner of Example 3. The pure xylitol (6380 g.) obtained after recrystallization once from water/ethanol melts at 90–91° C.

EXAMPLE 5

The decolorizing resin Asmit 173 NP (porous resin of aromatic amine type) employed in Example 1 is first washed with 4 l. of crude concentrated hydrochloric acid in 50 l. of deionized water and subsequently rinsed with about 80 l. of deionized water. The oxalic acid solution is concentrated to 9 l. in a rotary evaporator and cooled to 5° C. The oxalic acid (2120 g.) which precipitates crystalline is filtered off, washed with 500 ml. of ice-water and, optionally, dried. The recovered oxalic acid can be used for further hydrolyses without further ado.

After displacement of the oxalic acid, the decolorizing column can be regenerated as follows.

The decolorizing resin is washed with a solution of 1650 g. of sodium hydroxide in 50 l. of tap water and subsequently rinsed with ca. 200 l. of tap water. The resin is subsequently further washed with ca. 46 l. of deionized water and, finally, further with a solution of 200 ml. of glacial acetic in 10 l. of water. The thus treated decolorizing column can be employed for the decolorization and de-acidification of further hydrolysates.

EXAMPLE 6

28 kg. of freshly cut beech-wood shavings (water content 45%) was refluxed with 6.4 l. of water for one hour. The solution was discarded and the washing process was repeated utilizing the same conditions. After discarding the washing water, the shavings were mixed with 6.4 l. of a 1% aqueous oxalic acid solution. The resulting mixture was heated to 100° C. for one hour. The aqueous acid hydrolysate was replaced with 6.4 l. of 3% aqueous oxalic acid solution. After six hours at 100° C. the hydrolysis was terminated. The reaction mixture was cooled to 50° C. The shavings were separated and washed with 10 l. of deionized water. The wash waters were combined with the hydrolysate and the entire combination was deacidified and decolorized with the help of Asmit 137 NP (porous resin of aromatic amine type). After this, the combination of the wash waters and the hydrolysate were concentrated to 1 l. The concentrate had its pH adjusted to 7 by the addition of sodium hydroxide. After the addition of 10 g. of water wetted Raney-nickel the concentrate was hydrolyzed for four hours at 110° C. and under 30 atm. of pressure. After this period the catalyst was separated and washed with 150 ml. of deionized water. The wash water was combined with the filtrate and was filtered through Lewatit S 100 (resin on polystyrene basis). Thereafter the concentrate was carefully condensed under controlled conditions. The remaining oil was dissolved in 120 ml. of abs. ethanol and warmed to 40° C. and then slowly cooled to 15° C. 199 g. of fine white crystals of xylitol, M.P. 92–94° C., precipitated out. The purity of the xylitol was 97.5%.

We claim:
1. A process for producing xylose comprising hydrolyzing at a temperature of from 50° C. to 125° C., a cellulose and xylan containing material with an aqueous solution containing about 1% to about 5% by weight of oxalic acid.

2. The process of claim 1 wherein said material is beech wood.

3. The process of claim 1 wherein said material is an angiospermic material.

4. The process of claim 3 wherein said material is deciduous wood.

5. A process for producing xylose from a material comprising hydrolyzing at a temperature of from 50° C. to 125° C., a cellulose and xylan containing material with an aqueous solution containing about 1% to about 5% by weight of oxalic acid to produce a hydrolysate containing xylose, deacidifying and decolorizing said hydrolysate and concentrating such deacidified and decolorized hydrolysate to recover said xylose in substantially pure crystalline form.

6. The process of claim 5 wherein said material is an angiospermic material.

7. The process of claim 5 wherein said material is beech wood.

8. The process of claim 5 wherein said deacidification and decolorization is carried out by filtering the hydrolysate over a basic ion exchange resin.

9. In a process for producing xylose from a batch of cellulose and xylan containing material wherein the material is hydrolyzed at a temperature of from 50° C. to 125° C., with an aqueous oxalic acid solution containing about 1% to about 5% by weight of oxalic acid to produce a hydrolysate containing xylose; the improvement comprising passing the hydrolysate from said batch through a basic ion exchange resin to decolorize said hydrolysate and remove the oxalic acid from said hydrolysate eluting said oxalic acid from the resin, and adding said eluted oxalic acid to an aqueous medium containing a second batch of cellulose and xylan containing material to hydrolyze said second batch.

10. The process of claim 9 wherein said oxalic acid is eluted from said resin by means of an aqueous hydrochloric acid solution.

11. A process for producing xylose from a cellulose and xylan containing material comprising hydrolyzing at a temperature of from 50° C. to 125° C., a first batch of cellulose and xylan containing material with oxalic acid in an aqueous medium to produce a hydrolysate containing xylose and thereafter treating at a temperature of from 50° C. to 125° C., a second batch of cellulose and xylan containing material with said hydrolysate to convert the xylan in said material to xylose, the oxalic acid being present in the aqueous medium and hydrolysate in an amount of at least 1 percent by weight of the water present.

References Cited
UNITED STATES PATENTS 2,526,607  10/1950  Kurth _____ 127—37X
2,917,390  12/1959  Apel _____ 127—37X MORRIS O. WOLK, Primary Examiner S. MARANTZ, Assistant Examiner U.S. Cl. X.R.
260—635